May 26, 1953 H. V. SNYDER 2,639,626
TELESCOPIC STEERING COLUMN
Filed Aug. 13, 1951 2 Sheets-Sheet 1
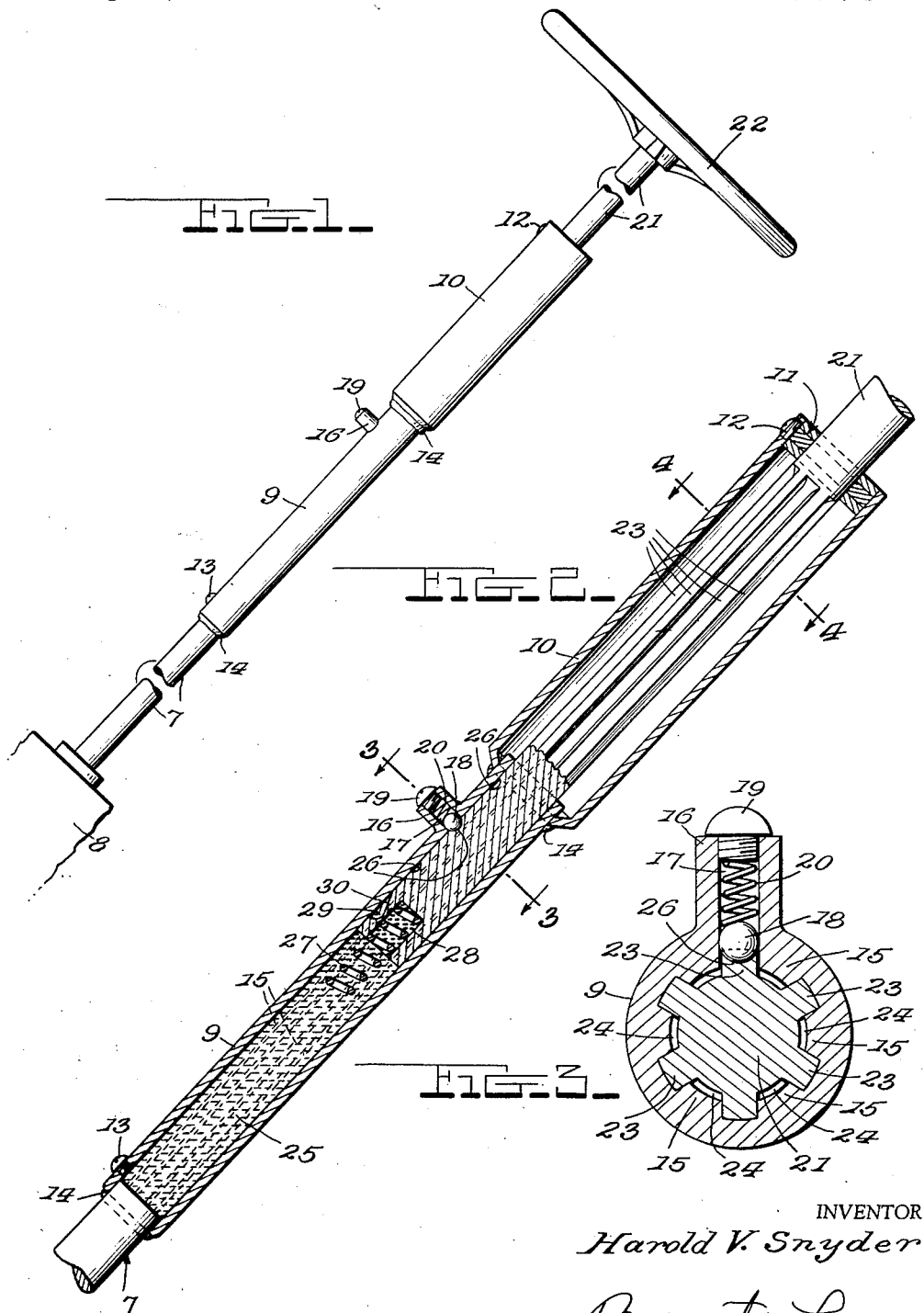
INVENTOR
*Harold V. Snyder*
BY *Bryant & Lowry*
ATTORNEYS

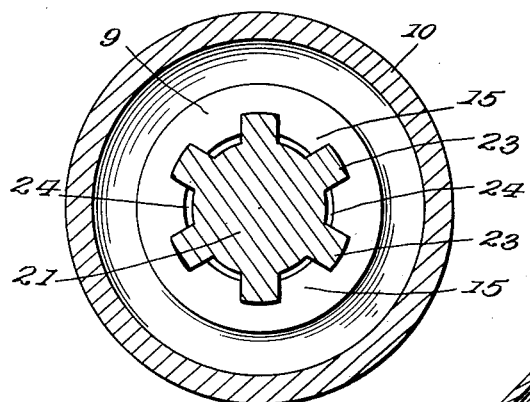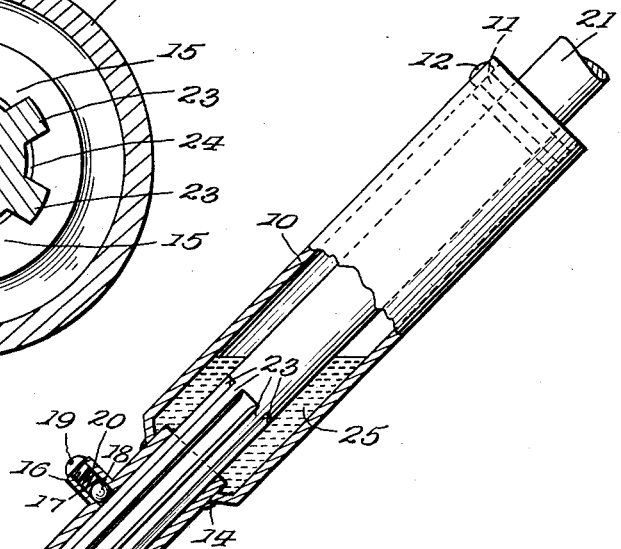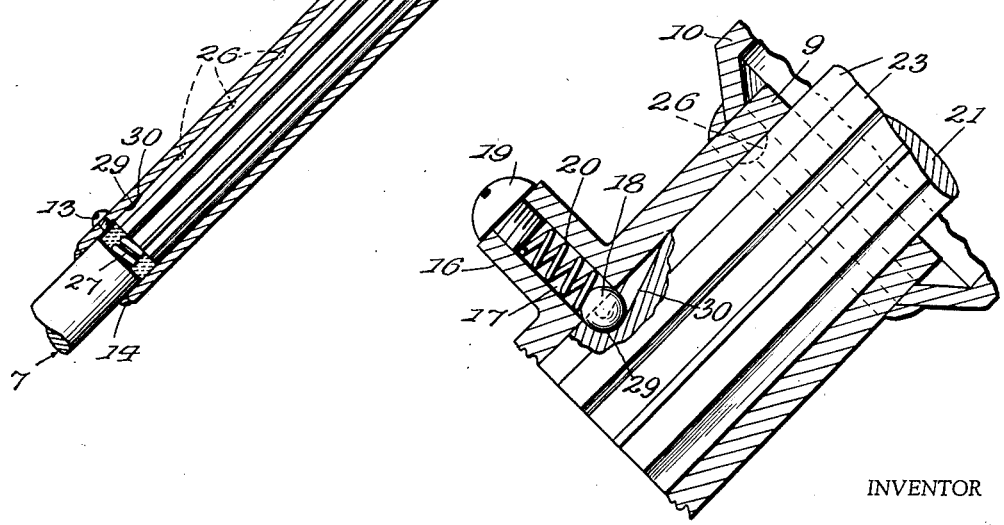

Patented May 26, 1953

2,639,626

UNITED STATES PATENT OFFICE 2,639,626

TELESCOPIC STEERING COLUMN

Harold V. Snyder, Iowa Falls, Iowa

Application August 13, 1951, Serial No. 241,570

2 Claims. (Cl. 74—493)

This invention relates to a new and improved steering column for motor vehicles of such construction that the steering wheel may yield forwardly in case the driver should be thrown against it due to collision or the like, thus cushioning the blow and minimizing the danger of injury.

The column comprises a lower section connected with the steering mechanism and having a tubular portion forming a cylinder and an upper section carrying the steering wheel, the lower end portion of said upper section being slidably splined in said cylinder of said lower section.

One object of the invention is to provide a spring-pressed ball carried by the cylinder of the lower column section, and a coacting socket in the upper column section, said ball being normally seated in said socket and yieldably holding said upper column section in its normal operative position, said ball, however, being cammed out of said socket by a forward blow on the wheel. As this movement of the ball from the socket is resisted by the spring which normally presses the ball into said socket, an initial checking force on the forward movement of the driver's body is exerted, should he be thrown forwardly against the wheel.

Another object of the invention is to provide such radial clearance between the splines of the upper column section and those of the lower column section as to form passages for allowing rearward displacement of fluid from the cylinder as the upper column section slides forwardly in said cylinder, thus providing an effective shock absorber tending to safely decelerate the forward movement of the driver's body should he be thrown against the wheel. The fluid is preferably oil, or common hydraulic brake or shock absorber fluid, and a receiver is provided to receive the fluid rearwardly displaced through the aforesaid passages.

Another object is to provide a compression spring connected in a novel manner with the lower end of the upper column section and providing for final shock absorption when said upper section is forwardly slid to the maximum in the cylinder of the lower section. Thus, when the above-mentioned ball and socket and fluid passages, and the compression spring, are all embodied in the same column structure, three shock absorbing actions will successively occur if the driver should be thrown against the wheel, thereby so gradually increasing the resistance as to safely decelerate the forward movement of the driver's body and therefore greatly lessening danger of injury.

To reset the steering column after an accident which has resulted in forward sliding of the upper section, this section is simply pulled rearwardly to the proper extent to again cause seating of the spring-pressed ball in the socket. A further object of the invention, however, is to provide the upper column section with an additional and relatively deep socket which receives the ball and coacts with the latter in preventing accidental withdrawal of the upper section completely from the lower section during resetting.

A still further object of the invention is to provide a cam at the rear side of the aforesaid deep socket, which cam forces the ball from this socket upon forwardly forcing the upper column section, thus allowing re-positioning of said upper section with the steering wheel the desired distance from the driver.

With the above and other objects in view that will become apparent as the nature of the invention is better understood, the same consists in the novel form, combination and arrangement of parts hereinafter more fully described, shown in the accompanying drawings, and claimed.

In the drawings,

Fig. 1 is a side elevation of the invention operatively related with a steering wheel and the gear casing of a steering mechanism, Fig. 2 is an enlarged longitudinal sectional view, partly in elevation, the upper column section being set in position for use, Figs. 3 and 4 are further enlarged transverse sectional views on lines 3—3 and 4—4 of Fig. 2, Fig. 5 is a view similar to Fig. 2 but showing the upper column section telescoped to the maximum with the lower section, and Fig. 6 is an enlarged fragmentary section, partly in elevation, showing the manner in which the spring-pressed ball prohibits complete accidental withdrawal of the upper column section from the lower section.

A preferred construction has been shown in the drawings and will be rather specifically described, but attention is invited to the possibility of making variations within the scope of the invention as claimed.

The lower steering column section 7 is operatively connected at its lower end with conventional gearing of a steering mechanism, a portion of the casing of the latter being shown at 8 in Fig. 1. This lower section 7 includes a tubular portion or cylinder 9 and a somewhat larger tubular fluid receiver 10, the lower end of this reservoir being in communication with the upper end of the cylinder 9. The upper end of the receiver 10 is provided with a sealing means 11 retained in position by the set screw plug 12, and the lower end of the cylinder 9 has a drain plug 13. The receiver 10, cylinder 9 and lower end portion of the column section 7, may well be formed from separate units welded together as indicated at 14.

Internally, the cylinder 9 is formed with splines 15 extending throughout its length. Externally, said cylinder is provided with a boss 16 near its upper end, said boss having a bore 17 disposed radially of said cylinder. The inner end of this bore 17 is occupied by a steel ball 18, a plug 19 is threaded into the outer end of said bore, and a compression spring 20 occupies said bore between said ball and plug. The lower section 7 is charged with fluid through the bore 17 upon removal of the plug 19, normally to the level of the base.

The upper section 21 of the column is in the form of a one-piece shaft having a steering wheel 22 at its upper end. This section 21 extends through the seal 11, through the receiver 10 and into the upper portion of the cylinder 9, and said section 21 is provided with splines 23. These splines 23 mesh with and engage the splines 15 of the cylinder 9 and the two sets of splines operatively connect the two column sections so that no relative radial or circumferential movements of said column sections can occur, but the upper section 21 may slide within the cylinder 9 of the lower section 7.

The splines of one set, are of slightly less radial width than the splines of the other set, to provide fluid passages 24 between the spline-connected portions of the column sections, as seen more particularly in Fig. 3. These passages 24 establish restricted communication between the receiver 10 and the portion of the cylinder 9 below the lower end of the upper column section 21. This cylinder portion contains a suitable fluid 25 which is displaced through the passages 24 into the receiver 10 when the upper section 21 of the column is forced forwardly, in case the driver should be thrown forwardly against the wheel 22. An effective shock absorbing action is thus obtained.

One of the splines 23 is formed with a plurality of longitudinally spaced shallow sockets 26 for coaction with the spring-pressed ball 18. The ball and sockets thus allow vertical adjustment of the upper column section 21 to most conveniently position the steering wheel 22. Moreover, in order for the section 21 to slide forwardly, the ball 18 must be cammed from the coacting socket against the action of the spring 20 and an initial shock absorbing action is thus produced, followed by further shock absorption due to forcing of the fluid 25 through the passages 24 into the receiver 10. The depth of each socket 26 is less than half the diameter of the ball 18 and is preferably about one-third of the diameter of said ball.

A final shock absorbing compression spring 27 is carried by the lower end of the upper column section 21 to strike the lower end of the cylinder 9. This spring is suitably secured at its rear extremity in a forwardly open socket 28 in the column section 21 and normally projects from this section as seen in Fig. 2.

Near the lower extremity of the column section 21, a relatively deep socket 29 is formed in one of the splines 23 to receive the ball 18, as shown in Fig. 6, if said column section 21 should be pulled back too far when resetting it. This socket 29 is of a depth to receive more than half the diameter of the ball 18, preferably about two-thirds of said diameter. Therefore, after the ball has entered the socket it cannot be cammed out of said socket by rearward force exerted on the column section 21. The ball and socket thus coact to prevent accidental withdrawal of the upper column section 21 completely from the lower section. At the rear side of the socket 29, however, there is a cam 30 extending to the socket bottom and effective to force the ball 18 from said socket when the column section 21 is forced forwardly from the position of Fig. 6. Thus, the section 21 may be again set in the desired position.

From the foregoing, it will be seen that three shock absorbing actions will successively take place if an accident should occur, resulting in the driver being thrown forwardly against the steering wheel. The first is due to the camming of the ball 18 out of the socket 26 against the action of the spring 20; the second is due to displacement of the fluid 25 through the passages 24; and the third is due to compression of the spring 27. These three actions serve to produce a stage effect with respect to the yieldability of the steering column downwardly. The first stage is present when the steering assembly is under normal conditions with ball 26 retaining the column against yielding movement; a light blow on the steering wheel will displace the ball and immediately subject the column to the second or intermediate stage action. The intermediate stage is provided by the oil reservoir 9, the receiving chamber 10 and the restricted openings 24 connecting the reservoir and chamber, thereby forming a hydraulic shock absorber designed to absorb the shocks in the usual manner. The rate of yielding movement is decreased in the second stage as compared with the ready movement of the first stage. The range of deceleration of the second stage is indicated by the distance between the end of spring 27 and the upper end of the column 7 in Fig. 2. Within such range, the rate is practically constant since it involves the oil passage through the restricted passages. Ordinarily, this stage will answer the conditions of accident, by absorbing the shocks.

However, it is possible that with serious accident conditions, the driver may be thrown into a draping position over the steering wheel, and thus provide a continuing weight factor which could not be absorbed by and during the intermediate stage and in such case, the rate of yield would continue until the steering column contacted element 7, with the possible development of a jarring effect upon the injured driver. The third stage is provided to meet the latter condition, contact of spring 27 with element 7 bringing the spring into action, its compression resistance easing the pressure of the column on the oil and thus gradually slowing and further decreasing the rate of yielding movement, until the column contacts element 7—spring 27 would remain inactive excepting under conditions such as this. Therefore, the forward movement of the driver's body is so gradually decelerated that danger of injury is reduced to the minimum. It will also be seen that the column may be readily reset without danger of entirely withdrawing the upper section from the lower section.

From the above detailed description of the invention, it is believed that the construction, use, and operation thereof will at once be apparent, and while there is herein shown and described the preferred embodiment of the invention, it is nevertheless to be understood that minor changes may be made therein without departing from the spirit and scope of the invention as claimed.

I claim:

1. A collapsible steering column for vehicles comprising an upper and a lower section associated for relative movement of the upper section axially within and into the lower section in presence of emergency conditions, the range of possible movement being of a definite length, said range length being zonal in type to constitute a stage development of the yielding movement with the stages rendered active successively and operative to provide rates of yielding generally similar within the individual zones with the rate of one zone differing from that of an adjacent zone, said rate of yielding being greatest when the column is in normal steering status and being least when the upper section is fully collapsed at the opposite end of such range of movement, the lower section including a hollow casing having a closed lower end with an intermediate zone of its length internally splined, the lower portion forming an oil reservoir and the upper portion forming a receiving chamber for receiving oil transferred from the reservoir, said upper section including a steering column splined longitudinally for cooperation with splines of the lower section, opposing faces of certain of the splines being in spaced relation to form restricted channels for oil transfer between the reservoir and the receiving chamber, the free end zone of the upper section carrying a compressible spring exposed within the reservoir, said lower section having a spring-supported ball within its intermediate zone, said ball being cooperative with a recess carried by a spline of the upper section for mounting the column in normal steering position, said ball being dislodgable from its seat in presence of a light blow applied to the top of the steering column, thereby constituting the first stage; said reservoir, restricted openings, and receiving chamber forming the operative structure of a hydraulic shock absorbing mechanism and constituting the intermediate stage, being adapted to be rendered active in response to displacement of the ball of the first stage; the third stage being constituted by the spring carried by the free end of the upper section and its cooperation with the closed end of the reservoir, said spring being normally inactive within the reservoir and when rendered active being operative to additionally retard the rate of yielding movement within the approach to the remote end of the range of movement.

2. A steering column as in claim 1 characterized in that the ball-receiving recess of the steering column spline forming the normal column positioning means during steering is of a depth less than half the diameter of the ball, said spline having a second recess of greater depth than such half diameter and operative to prevent complete withdrawal of the column when the latter is being re-positioned.

HAROLD V. SNYDER.

References Cited in the file of this patent

UNITED STATES PATENTS

| Number | Name | Date |
|---|---|---|
| 912,215 | Warren | Feb. 9, 1909 |
| 1,503,881 | Bros | Aug. 5, 1924 |
| 2,028,953 | Roark | Jan. 28, 1936 |
| 2,075,110 | Garretson | Mar. 30, 1937 |
| 2,140,319 | Heppner et al. | Dec. 13, 1939 |
| 2,227,821 | Burrell | Jan. 7, 1941 |
| 2,254,640 | Baker | Sept. 2, 1941 |
| 2,263,284 | Beecher | Nov. 18, 1941 |
| 2,369,007 | Beecher | Feb. 6, 1945 |

FOREIGN PATENTS

| Number | Country | Date |
|---|---|---|
| 698,526 | Germany | Nov. 12, 1940 |
| 484,978 | Great Britain | May 12, 1938 |